C. N. CAHUSAC.
ELECTROMECHANICAL SWITCH.
APPLICATION FILED APR. 2, 1917.

1,283,466.

Patented Nov. 5, 1918.
3 SHEETS—SHEET 1.

Witness
Chas. L. Griesbauer.

Inventor
Clarence N. Cahusac
by Percy B. Hills
Attorney

C. N. CAHUSAC.
ELECTROMECHANICAL SWITCH.
APPLICATION FILED APR. 2, 1917.
1,283,466.
Patented Nov. 5, 1918.
3 SHEETS—SHEET 2.
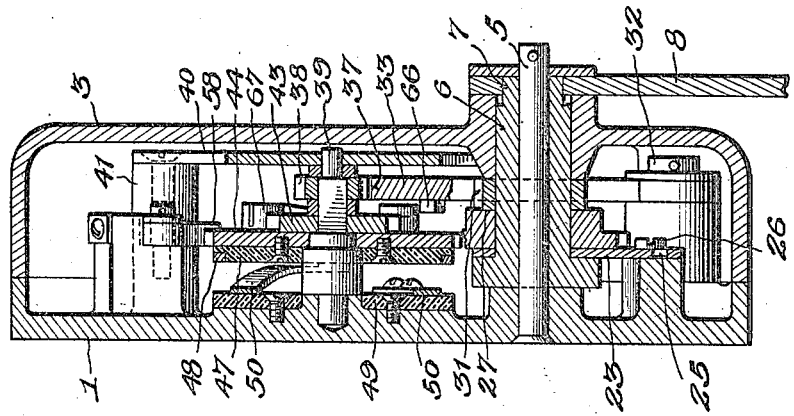
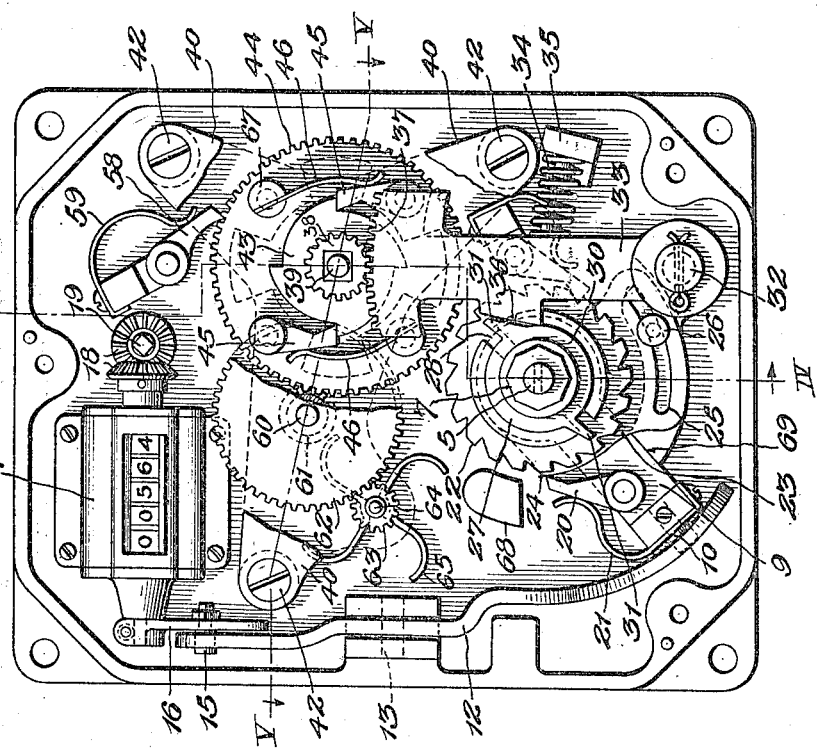

C. N. CAHUSAC.
ELECTROMECHANICAL SWITCH.
APPLICATION FILED APR. 2, 1917.
1,283,466.
Patented Nov. 5, 1918.
3 SHEETS—SHEET 3.
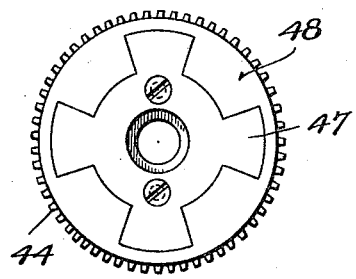
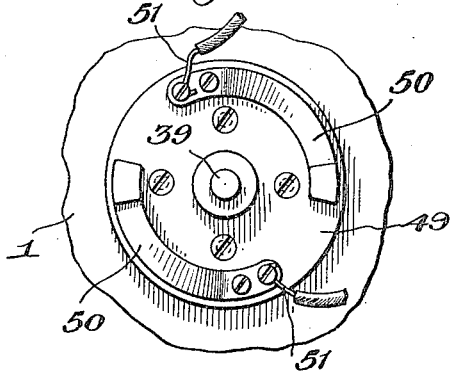
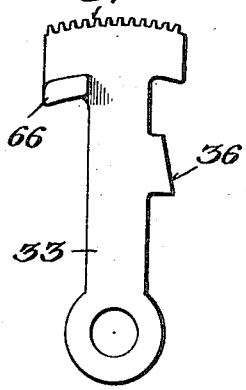
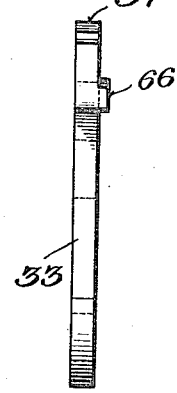
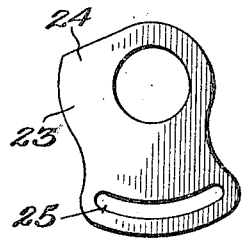
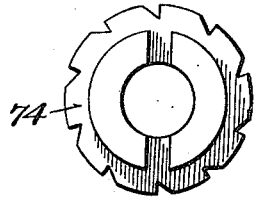
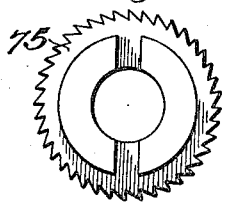
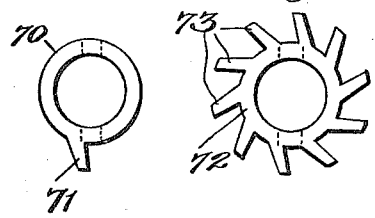
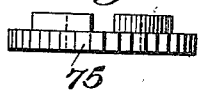
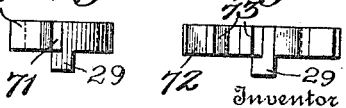

UNITED STATES PATENT OFFICE.

CLARENCE N. CAHUSAC, OF JERSEY CITY, NEW JERSEY, ASSIGNOR TO SLOCUM, AVRAM & SLOCUM, INC., OF NEW YORK, N. Y., A CORPORATION OF NEW YORK.

ELECTROMECHANICAL SWITCH.

1,283,466.  Specification of Letters Patent.  Patented Nov. 5, 1918.

Application filed April 2, 1917. Serial No. 159,313.

*To all whom it may concern:*

Be it known that I, CLARENCE N. CAHUSAC, a citizen of the United States, and resident of Jersey City, in the county of Bergen and State of New Jersey, have invented certain new and useful Improvements in Electromechanical Switches, of which the following is a specification.

My invention relates to electro-mechanical switches, more particularly designed for use in connection with an efficient recorder for machines, and is intended primarily to provide an improved construction over that disclosed in Letters Patent No. 1,151,848, granted August 31, 1915, to Slocum, Avram & Slocum, Inc., as the assignee of Mois H. Avram. In said Letters Patent a dash pot is utilized to prolong the electrical contact, and while the said contact is described as having a flexible or sliding movement between its parts, still such movement is very slight, and has been found not to be sufficient to maintain bright contact surfaces. Furthermore, the dash pot construction has not been found to be thoroughly acceptable, and among the objects of the present invention are, first, to provide a positive sliding contact during the circuit closing operation, and, secondly, to dispense with the dash pot construction and to replace the same by a spring operated mechanism.

The invention also embodies certain minor novel details of construction, as hereinafter will be pointed out more definitely, reference being had to the accompanying drawings, in which:—

Fig. 3 is a face view of the device, the cap plate being removed and a portion of the interior frame being broken away.

Fig. 4 is a vertical transverse sectional view on the line IV—IV of Fig. 3.

Fig. 6 is a detail view of the underside of the gear contact wheel.

Fig. 7 is a detail view of the contact plate and its contacts, which latter bear against the gear contact wheel.

Figs. 8 and 9 are detail views, taken at a right angle to each other, of the rack lever.

Fig. 10 is a detail plan view of a cut-off plate.

Figs. 11 to 18 are details of the various gear wheels interchangeably used to produce varying operations.

Similar numerals of reference denote corresponding parts in the several views.

Figure 1:
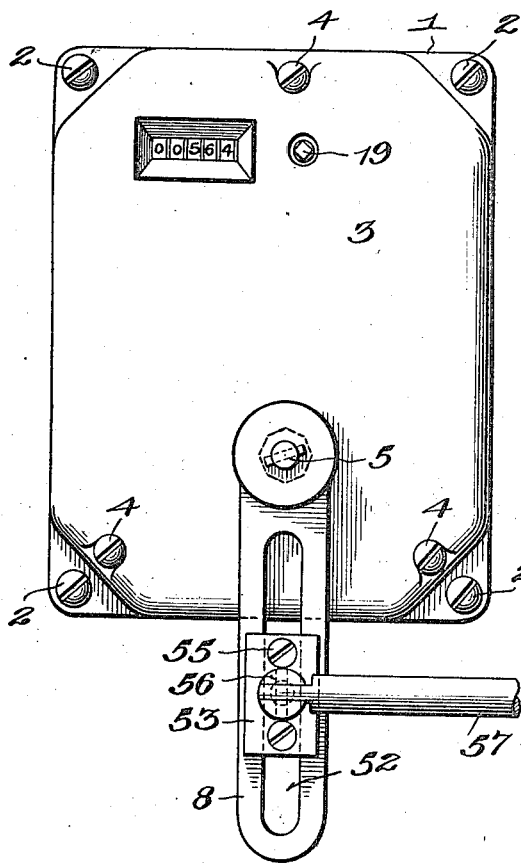
Figure 1 is a front elevation of my improved mechanism.
Figure 2:
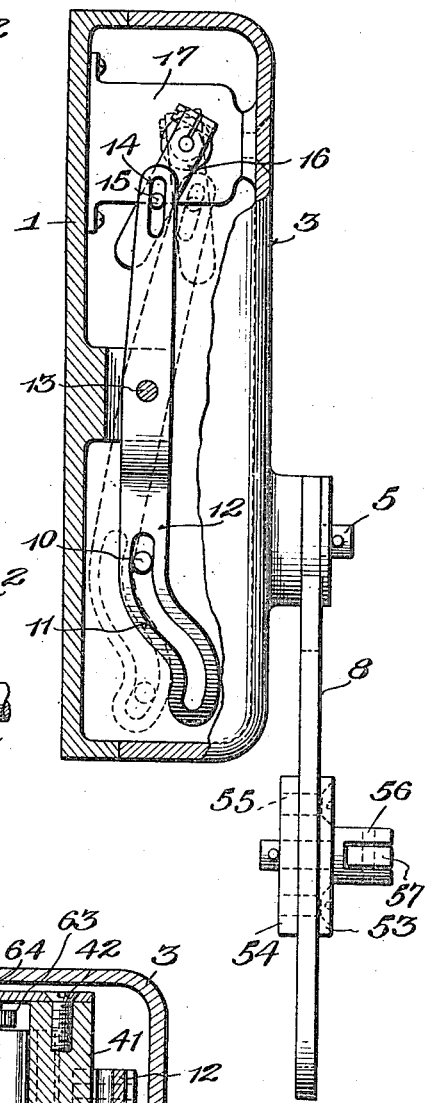
Fig. 2 is a side elevation of the same, the side wall of the casing being partly broken away.
Figure 5:
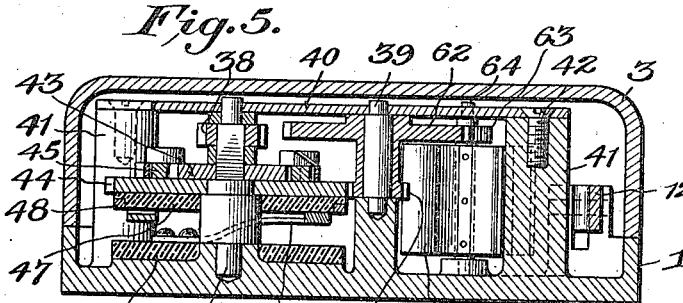
Fig. 5 is a horizontal transverse sectional view on the line V—V of Fig. 3.

In the said drawings the reference numeral 1 denotes a base plate, which is intended to be attached to the wall of a room by means of screws 2, and which when in use is covered by a cover plate 3, attached thereto by means of screws 4. Fixed in the base plate 1 is a shaft 5, which has mounted to rotate freely thereon a sleeve 6 that is formed angular at its outer end at 7 to receive an actuating lever 8, hereinafter described. Also fixed to the sleeve 6 near its inner end is a bar 9, adapted to be vibrated when said sleeve is vibrated by the actuating lever 8. Said bar 9 has fixed in its outer end a pin 10, which engages a slot 11 formed in the irregularly curved outer end of a lever 12, pivoted at 13 in the frame 1, and at its inner end is slotted at 14 to receive a pin 15, fixed in an arm 16, which in turn is connected to the shaft of a conventional counter 17, the latter being provided with gears 18, the shaft 19 of one of which is adapted to receive a key for the purpose of resetting the same, as will be understood. By reference to Fig. 2, it will be observed that the curvature of the lever 12 is such that should the bar 9 be vibrated, such vibration will impart a vibratory movement to the outer end of the lever 12, which in turn will be imparted to its inner end, and through the slot and pin connection 14, 15, be imparted to the lever 16 of the counter 17, whereby each vibration of the bar 9 will impart a counting step to the counter 17. Also fixed upon the bar 9 is a pawl 20, influenced by a spring 21, and adapted under certain conditions to engage the teeth of a ratchet wheel 22 mounted freely on the sleeve 6. When left free, said pawl 20 will engage and actuate said ratchet wheel 22 the full limit of its stroke, but as it is desired at times to limit the stroke imparted to the ratchet wheel 22, I provide a guard plate 23, shown in detail in Fig. 10, said guard plate being mounted freely upon the sleeve 6. Said guard plate is so shaped as to provide an extension 24, which is curved to correspond to the curvature of the ratchet wheel 22, but which extends slightly outside of its ratchet teeth, as best seen in Fig. 3. Said plate is also slotted at 25 on the arc of a circle struck from the shaft 5, and through said slot passes a set-screw 26 engaged with the base plate 1. It will be understood that by loosening the set-screw 26, the guard plate 23 may be shifted around the sleeve 6 as a center so as to come within the path of travel of the pawl 20, and may be disposed so as to prevent the engagement of said pawl with the teeth of the ratchet 22 during a greater or less extent of the movement of said pawl, said guard plate being shown in Fig. 3 adjusted to such position as to prevent the pawl 20 from engaging with the teeth of the ratchet wheel 22 until almost at the limit of its stroke, whereby said ratchet wheel 22 will be fed one tooth for each stroke of said pawl.

Formed integral with the ratchet wheel 22 is a hub 27 that is slotted on opposite sides at 28 to receive studs formed upon the underside of a cam wheel 30 to lock the two together, said cam wheel in Fig. 3 being shown as provided with two cams 31 oppositely disposed.

Mounted upon a pin 32 projecting outwardly from the base plate 1 is a rack lever 33, said lever being normally spring-pressed to the left in Fig. 3 by means of a coiled spring 34 disposed between the same and an abutment 35 formed integral with the base plate 1, and said rack lever is also provided upon its opposite face with an inclined surface 36 against which the cams 31 are adapted to contact during the rotation of the cam wheel 30, whereby said rack lever will be shifted by said cams to the left twice during each rotation of said cam wheel 30. At its outer end said rack lever 33 is formed with a toothed rack 37 adapted to engage a gear wheel 38 fixed to a shaft 39, which is mounted in the base plate 1 and at its outer end in a cap plate 40, said plate being substantially of the shape of a three-pointed star, and being shown in Fig. 3 partly in full lines and partly in dotted lines, the same being attached to posts 41 projecting from the base plate 1 by means of screws 42. Also fixed to said shaft 39 is a ratchet wheel 43, while mounted freely on said shaft and immediately inside of said ratchet wheel is a gear wheel 44, said gear wheel having mounted thereon oppositely disposed pawls 45, influenced by springs 46, and adapted to engage the teeth of the ratchet wheel 43. The said gear wheel 44 has fixed to its inner side, but insulated therefrom, by a non-conducting plate 47, a plate 48, the same being cut away internally substantially in the shape of a Maltese cross, as best seen in detail in Fig. 6, and the intermediate insulated plate 48 is shaped to project into said cut away space in said plate 47, so as to lie flush with its outer surface. A circular insulating plate 49 of substantially the diameter of the plate 48 is fixed to the base plate 1 in register with said plate 48 and gear wheel 44, and the same carries two curved spring contacts 50 adapted to bear at their free ends against said plate 47 and 48, so as to slide thereon and to contact alternately with the inwardly radially projecting portions of said plate 48 and the outwardly projecting portions of the insulating plate 47, thereby alternately to make and break contact. Fixed to said contacts 50 are the usual electric wires 51, leading to any suitable source of electrical energy, the construction being such that when the contacts 50 lie against the inwardly projecting portions of the plate 48, a closed circuit will be established, which will be broken when the gear wheel 44 and plate 48 are partly rotated to bring the insulating plate 47 into contact with said spring contacts 50.

The actuating lever 8 preferably is slotted at 52 to receive adjustably a clamp formed of oppositely disposed plates 53, 54, connected by screws 55, whereby said clamp may be fixed in any adjusted position. Swiveled in said clamp is a socket 56 adapted to receive a shaft 57, which is attached in any suitable manner to the machine to be registered, whereby an operation of the machine will impart a vibratory movement to said lever 8.

From the above description the operation of my improved construction will be understood to be as follows:—With the parts in the position shown in Fig. 3, it will be observed that one of the cams 31 is substantially in contact with the inclined surface 36 on the side of the rack lever 33. Now, upon a reciprocating movement being imparted to the lever 8, said movement will reciprocate the sleeve 6, thereby imparting a similar reciprocation to the bar 9, and with the guard plate 23 adjusted as shown in Fig. 3, said reciprocation will cause the pawl 20 to move the ratchet wheel 22 a distance equal to one tooth thereof. Through the connection of the cam wheel 30 with the ratchet wheel 22, the former will be moved a corresponding distance, which will cause the cam 31 to force the rack lever 33 to the right, against the tension of its spring 34, but will not move said cam 31 a distance sufficient to cause it to pass beyond the inclined surface 36. This movement of the rack lever 33, will, through the engagement of the toothed rack 37 thereof with the gear wheel 38, cause the latter to be rotated, and with it the ratchet wheel 43, the gear wheel 44 carrying the pawls 45 being held against movement by a pawl 58 influenced by a spring 59, and engaging the teeth of said gear wheel 44, thereby preventing any movement of said wheel and its pawls 45. Another reciprocation of the lever 8 will in a similar manner impart a movement equal to another tooth of the ratchet wheel 22, which will cause the cam 31 to move past the inclined surface 36 of the rack lever 33, thereby releasing the latter and permitting its return to its initial position, shown in Fig. 3, under the influence of the spring 34. The slight additional movement to the right initially imparted to the rack lever 33 through this second movement of the cam 31, causes a sufficient additional rotation of the ratchet wheel 43 to cause the pawls 45 to engage the next succeeding teeth, the result being that as the rack lever 33 is returned to its initial position when released, the rack 37 thereon will rotate the gear wheel 38 in the reverse direction, and, through the engagement of the teeth of the wheel 43 by the pawls 45, correspondingly will rotate the gear wheel 44, thereby moving the plate 48 carried by said gear wheel a distance equal to the space between adjacent projecting portions of the insulating plate 47, whereby the spring contacts 50, which, in the position of the parts shown in Fig. 3, are in contact with the opposite projecting portions of the insulating plate 47, will, by this movement of the gear wheel 44, be swept across the opposite inwardly projecting portions of the plate 48, and will, during the length of time of that contact, close the electric circuit, which contact, however, will be broken by said spring contacts leaving the plate 48 and coming to rest upon the next oppositely projecting portions of the insulation 47. In other words, for each vibration of the rack lever 33 there will be an electric impulse, which, however, always will be broken automatically by the return of said rack lever to its initial position, when released by the pawl 31. From this construction, it will be understood that it is impossible under any circumstance for a closed contact to be maintained, no matter in what position the machine being registered may happen to stop, as any movement of the rack lever 33 and its connected parts to close the circuit automatically will cause a consequent breaking of said circuit.

Journaled between the base plate 1 and the cap plate 40 is a shaft 60 having fixed thereto an inner small gear wheel 61 and an outer larger gear wheel 62, the former meshing with the gear wheel 44, and the latter meshing with a smaller gear wheel 63 fixed to a shaft 64, also mounted between the base plate 1 and the cap plate 40, and carrying conventional curved fan blades 65, which operate as a governor during the rotation of the gear wheel 44 and plate 48, thereby tending to check the speed of the same. And the rotation of the gear wheel 44 and its parts under the return movement of the rack lever 33 is limited by an abutment 66 formed on the inner face of said rack lever 33, and against which the projections 67 on the gear wheel 44, upon which the pawls 45 and their springs 46 are mounted, contact, it being observed that because of the movement of said rack lever to the right under the influence of the pawl 31, said abutment 66 will be moved out of the path of travel of the stops 67, to permit the passage past the same of one stop, but will move into said path to receive the succeeding stop. Projecting from the base plate 1 is another abutment 68, which forms a stop to limit the movement of the bar 9 in one direction, a similar abutment 69 limiting its movement in the opposite direction, said latter abutment receiving the set screw 26, whereby the guard plate 23 is adjusted.

It will be observed from an inspection of Fig. 3 that the ratchet wheel 22 is provided with twenty teeth, while the cam wheel 30 is provided with two oppositely disposed cams 31. Now, it will be understood that these wheels are removable, and may be replaced by wheels having a different number of teeth and different cams, whereby the number of electrical impulses imparted in proportion to the number of operations of the machine being registered may be varied at will. Thus, I have shown in Figs. 15 and 16, two views of another cam wheel 70, the same having but one cam 71 thereon, said cam wheel being adapted to be substituted for the cam wheel 30. With this cam wheel 70 in use, it will be apparent that there will be but one operation of the rack lever 33 for each twenty impulses imparted to the ratchet wheel 22, so that there will be one electrical impulse for each twenty operations of the machine to which this device is attached. So also another cam wheel 72 shown in Figs. 17 and 18 may be substituted for the cam wheel 30, said cam wheel 72 having ten cams 72. With this cam wheel in use, an electrical impulse may be imparted for each reciprocation or throw of the lever 8, the rack lever 33 being actuated by one of the cams 72 each time. But to accomplish this, the guard plate 23 must be shifted to the right so that the pawl 20 may engage one of the teeth of the ratchet wheel 22 at the beginning of its operating stroke, it being necessary that the ratchet wheel 22 be moved the distance of two of its teeth in order that each of the cams 72 shall impart a complete impulse to the rack lever 33. Still another way of imparting one impulse for each reciprocation or throw of the lever 8 is to substitute for the ratchet wheel 22 another ratchet wheel 74, shown in Figs. 11 and 12, said ratchet wheel 24 having but ten teeth, it being apparent that each operation of the pawl 20 will move said ratchet wheel the distance of one of its teeth, which is the distance of two of the teeth of the ratchet wheel 22, whereby the cam wheel 72 will impart an impulse to the rack lever 33 for each operation of said ratchet wheel 74. And I contemplate employing still another ratchet wheel 75 in place of the ratchet wheels 22 and 74, said ratchet wheel being shown in Figs. 13 and 14, and being provided with forty teeth. Now, it will be obvious that the various combinations which may be produced by the interchangeability of these ratchet wheels and cam wheels have a wide range, and best may be expressed by the following table—

| One electrical impulse | | | |
|---|---|---|---|
| 1 throw | 1 tooth of 74 | Cam wheel 72 | |
| 2 throws | 1 " " 22 | " " 72 | |
| 4 " | 1 " " 75 | " " 72 | |
| 5 " | 1 " " 74 | " " 30 | |
| 10 " | 1 " " 22 | " " 30 | |
| 10 " | 1 " " 74 | " " 70 | |
| 20 " | 1 " " 75 | " " 30 | |
| 20 " | 1 " " 74 | " " 70 | |
| 40 " | 1 " " 75 | " " 70 | |

In Figs. 16 and 18, the cam wheels 70 and 72 are shown provided on their under sides with studs 29, which are similar to the studs formed on the underside of the cam wheel 30, and which serve, like said studs of cam wheel 30, to lock these cam wheels to their respective ratchet wheels, said ratchet wheels being slotted on opposite sides similar to the slots 28 of the ratchet wheel 22.

Having thus described my invention, what I claim as new and desire to secure by Letters Patent, is:—

1. In a device of the character described, a lever adapted to be actuated intermittently in one direction by the machine to be registered, means for returning it to its initial position automatically, a rack on the free end of said lever, a gear wheel engaged to be rotated by said rack, a ratchet wheel moving with said gear wheel, a member having on one surface alternate contact spaces and insulated spaces and actuated intermittently by said ratchet wheel during the return movement only of said lever, and fixed contacts lying against said member so as to rub said alternate contact and insulating spaces, said contacts being adjusted so as to contact with said insulated spaces only when the lever is at either extreme of its movement.

2. In a device of the character described, an oscillatable member adapted to be actuated by the machine to be registered, a bar movable with said member, a pawl carried by said bar, a ratchet wheel adapted to be actuated intermittently by said pawl, a cam wheel moved with said ratchet wheel, a rack lever pivoted to be actuated by the cams on said cam wheel, a spring for returning said rack lever to its initial position, a rack on the free end of said rack lever, a gear wheel engaged to be rotated by said rack, a ratchet wheel moving with said gear wheel, a member having on one surface alternate contact spaces and insulated spaces and actuated intermittently by said ratchet wheel during the return movement only of said lever, and fixed contacts lying against said member so as to rub said alternate contact and insulating spaces, said contacts being adjusted to contact with said insulated spaces only when the lever is at either extreme of its movement.

3. In a device of the character described, an oscillatable member, means operated by the machine to be registered for actuating said member, a bar movable with said member, a pawl carried by said bar, a ratchet wheel adapted to be actuated intermittently by said pawl, interchangeable cam wheels having different numbers of cams thereon and movable with said ratchet wheel, a rack lever pivoted to be actuated by the cams on said wheel, a spring for returning said rack lever to its initial position, contacts, and means operated by the spring movement of said rack bar for closing said contacts, said contacts being opened when said rack bar is at either extreme of its movement.

4. In a device of the character described, an oscillatable member, means operated by the machine to be registered for actuating said member, a bar movable with said member, a pawl carried by said bar, interchangeable ratchet wheels having varying numbers of teeth and adapted to be actuated intermittently by said pawl, interchangeable cam wheels having different numbers of cams thereon and movable with said ratchet wheel, a rack lever pivoted to be actuated by the cams on said wheel, a spring for returning said rack lever to its initial position, contacts, and means operated by the spring movement of said rack bar for closing said contacts, said contacts being opened when said rack bar is at either extreme of its movement.

Signed at the city of New York in the county of and State of New York this 22nd day of March, A. D. 1917.

CLARENCE N. CAHUSAC.